United States Patent [19]

Toyoda et al.

[11] Patent Number: 4,947,541
[45] Date of Patent: Aug. 14, 1990

[54] METHOD FOR PRODUCING A THIN FILM HEAD

[75] Inventors: Atsushi Toyoda; Shuichi Sawada, both of Hamamatsu, Japan

[73] Assignee: Yamaha Corporation, Hamamatsu, Japan

[21] Appl. No.: 401,130

[22] Filed: Sep. 1, 1989

[30] Foreign Application Priority Data

Sep. 2, 1988 [JP] Japan .............................. 63-220032

[51] Int. Cl.$^5$ .............................................. G11B 5/33
[52] U.S. Cl. ...................................... 29/603; 360/119
[58] Field of Search ................. 29/603; 360/119–121, 360/125, 127

[56] References Cited

U.S. PATENT DOCUMENTS 4,224,361 9/1980 Romankiw .
4,238,559 12/1980 Feng et al. .
4,256,816 3/1981 Dunkleberger .
4,550,353 10/1985 Hirai et al. ........................ 29/603 X Primary Examiner—Carl E. Hall
Attorney, Agent, or Firm—Burns, Doane, Swecker & Mathis

[57] ABSTRACT

A lower core is formed on the surface of a wafer and then a protection film made of substance that has a lower ion milling rate than that of the lower core is formed so as to coat the lower core. Then, the protection film is ground to expose the lower core under the film, and the surface of the protection film and that of the lower core are finished smooth and level. Then, ion beams are radiated to simultaneously mill both the protection film and the lower core and thereby form a recess above the lower core. Next, a gap layer is formed on the surfaces of both the protection film and the lower core. Then, an upper core is formed in the recess above the lower core with a gap layer between them. Accordingly, only the part in which the pole of the upper core and the pole of the lower core face each other in parallel is magnetically effective. This ensures a constant track width even in mass production provided that only the lower core is formed strictly in accordance with the design. In this case, formation of a lower core in accordance with the design is possible. Further, since the surplus part of the upper core does not actually provide a read/write function of a head, cross-talk is seldom generated between adjacent tracks. Conducting milling before forming an upper core elminates magnetic short-circuiting between the upper and lower cores.

4 Claims, 5 Drawing Sheets

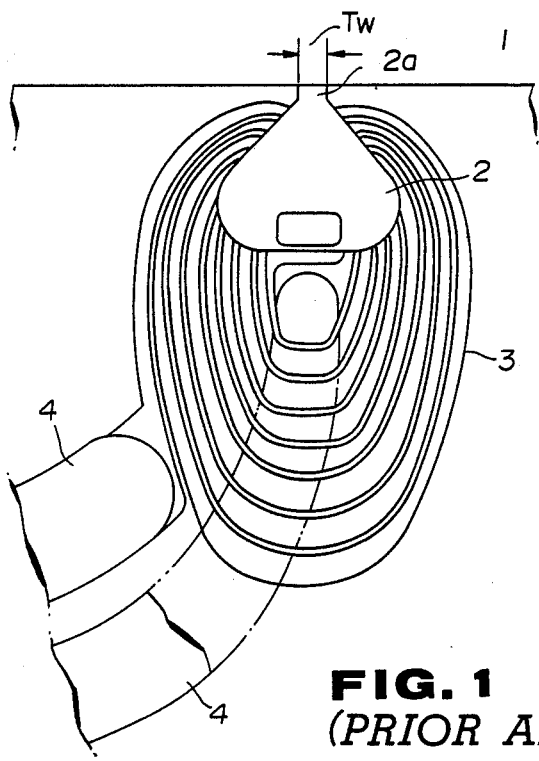
FIG. 1
*(PRIOR ART)*
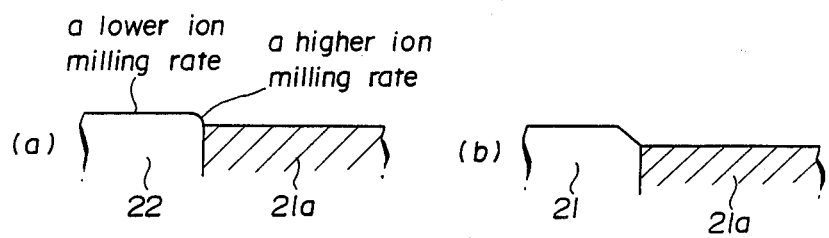
FIG. 13(a)     FIG. 13(b)
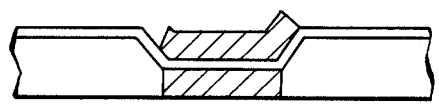
FIG. 14

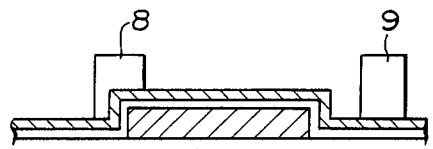
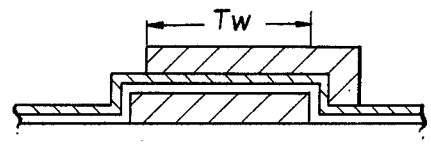
FIG. 3
(PRIOR ART)
FIG. 4
(PRIOR ART)
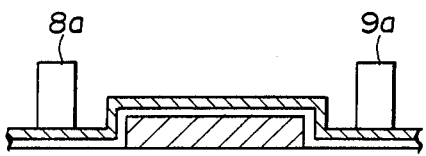
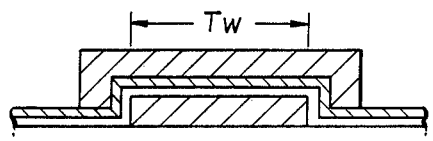
FIG. 5
(PRIOR ART)
FIG. 6
(PRIOR ART)
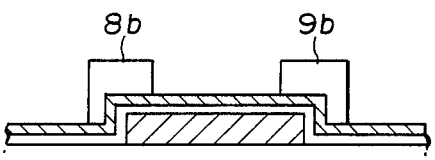
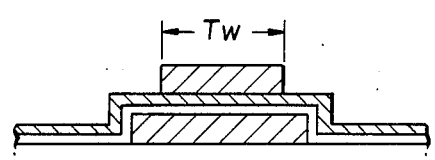
FIG. 7
(PRIOR ART)
FIG. 8
(PRIOR ART)

METHOD FOR PRODUCING A THIN FILM HEAD

BACKGROUND OF THE INVENTION

1. Field of Application

The present invention relates to a method for producing a thin film head which is used in magnetic disk units.

2. Prior Art

FIG. 1 is a plan view showing an exterior view of a conventional thin film head. In FIG. 1, There is a wafer (1) and an upper core.(2). At the front end of the upper core (2), an upper pole (2a) is formed. A coil (3) is connected at both ends to pad sections (4, 4).

FIG. 2 contains sectional views showing processes for producing the thin film head. These sectional views show the opposing faces of the upper and lower poles (FIG. 1) that face a recording medium (disk). The following describes the processes for producing the thin film head.

[1] First, a lower core (5) is formed on the surface of a wafer (1) by forming a permalloy (NiFe) into a rectangular shape by sputtering or vacuum deposition (See FIG. 2a). In FIG. 2, the symbol 2a designates the lower pole.

[2] Next, a gap layer (6) is formed by laminating alumina ($Al_2O_3$) so as to coat the lower core (5) by sputtering. (See FIG. 2b).

[3] Then, a coil (3) is formed above the lower core (5) (See FIG. 1.). In this case, the coil (3) is coated with an insulation layer (not shown) so that the coil (3) does not contact the lower core (5) and upper core 2 which is formed in a later process.

[4] Next, a plating base (7) is formed by laminating a permalloy on the surface of the gap layer (6) by means of sputtering (See FIG. 2c.).

[5] After forming the plating base (7), resist frames (8 and 9) for plating the upper core with a rectangular shape are formed on both sides of the lower core as shown in FIG. 2d.

[6] Then, a permalloy is laminated on the surface of the plating base (7) by electroplating. (See FIG. 2e.) This forms an upper core (2) between the resist frames (8 and 9). In FIG. 2, the symbol 2a designates an upper pole. The width of the portion where the lower core (5) faces the upper core (2) through the gap layer (6) is the track width, Tw (that is, the width of poles 2a and 5a).

[7] After forming the upper core (2), the resist frames (8 and 9) are removed by using a remover (solvent) (See FIG. 2f.).

[8] Next, the exposed plating base which was covered by the resist frames is removed by ion miling (See FIG. 2g.). This almost completes the formation of the head.

[9] After finishing the above-mentioned process, a resist mask (10) is formed on the core section to coat the upper core (2) by photolithography (See FIG. 2h.).

[10] Next, all parts not to be included in the head are removed by etching. (See FIG. 2i.)

[11] Finally, the resist mask (10) on the core section is removed by means of a remover (solvent) (See FIG. 2j.).

Above is a description of the processes for producing a thin film head. However, the above-constructed thin film head has the following disadvantages. When the resist frames (8 and 9) are formed to plate the upper core (see FIG. 2d), the upper and lower cores often go out of alignment. For example, as shown in FIG. 3, when the resist frame (9) is positioned to the right apart from the lower core (5), the upper core (2) is positioned off to the right, as shown in FIG. 4.

Furthermore, the exposure device easily goes out of focus when aligning partly because the wafer (1) already has many surface level gradations on its contact surface with the coil and pad. For example, if a wider area than the set track width is exposed, the resist frames (8 and 9) for plating the upper core are formed apart from both sectional sides of the lower core, as shown in FIG. 5. Consequently, the upper core formed is wider than the lower core. To prevent this, exposure may be made narrower than the actual width to allow for the lack of focus. In this case, however, resist frames 8b and 9b for plating the upper core may be formed with a distance between them that is narrower than the width of the lower core, as is shown in FIG. 7. Consequently, the upper core formed may be narrower than the lower core.

Above is a description of the disadvantages of using a known method for producing thin film heads. The method is very susceptible to out-of-alignment and out-of-focus resulting in the formation of the upper and lower cores of different width as shown in FIGS. 4, 6 and 8. If the width of the upper core is narrower than that of the lower core and the track width Tw is narrower than the set value, the regeneration output level is lower. On the other hand, a possible surplus part outside the track width Tw may come in contact with an adjacent track and cause cross-talk.

Another way to form the head is shown in FIG. 9. In this method, ion-milling is performed after forming the upper core (14) on the gap (12) narrower than the lower core (13) (refer to Publication of unexamined Japanese patent application No. Tokukaisho 63-55711 (1988)). As shown in FIG. 10, when ion-milling is conducted, an ion beam (e.g. cation argon) collides against the lower core (13) and scatters magnetic materials which adhere to the side of the upper core (14). This magnetically shorts the upper and lower cores (13 and 14), as shown in FIG. 11. The magnetic shortcircuiting of the upper and lower cores (13 and 14) significantly reduces the read/write efficiency of the head.

SUMMARY OF THE INVENTION

The present invention has been made to eliminate these difficulties. The objective of the invention, therefore, is to provide a method for producing a thin film head that can have a constant track width, without having cross-talk generated between adjacent tracks and without magnetic shortcircuiting of the upper and lower cores by magnetic materials scattered when ion-milling is conducted.

In order to achieve this objective, the method of the present invention is characterized by the following processes. A lower core is formed on the surface of a wafer and then a protection film made of substance that has a lower ion milling rate than that of the lower core is formed so as to coat the lower core. Then, the protection film is ground to expose the lower core under the film, and the surface of the protection film and that of the lower core are finished smooth and level with each other. Then, ion beams are radiated to simultaneously mill both the protection film and the lower core and thereby form a recess above the lower core. Next, a gap layer is formed on the surfaces of both the protection film and the lower core. Then, an upper core is formed in the recess above the lower core with the gap layer between the upper core and the lower core.

By the present method, milling the protection film made of a substance having an ion milling rate lower than that of the lower core and the lower core simultaneously causes the lower core to be cut faster than the protection film. This makes the lower core level differ from the protection film level. Moreover, the difference in the level between the protection film and the lower core made by this process results in a taper or bevel at the edge of the lower core as the milling proceeds, because a corner is more easily milled. Another reason is that with any material, inclined areas generally have a higher ion milling rate than flat areas. Then, by forming an upper core in the recess with tapered sides with a gap layer between the upper core and the lower core, an azimuth loss is generated so that the inclined part of the upper core is actually independent of the read/write function of the head. That is, even if the resist frames for plating the upper core are not properly formed because of a lack of alignment or focus generated during the formation of the frames, the inclined part of the upper core formed between the improperly positioned frames does not have a magnetic influence.

Accordingly, only the part in which the pole of the upper core and the pole of the lower core face each other in parallel is magnetically effective. This ensures a constant track width even in mass production provided that the lower core is formed strictly in accordance with the design. In this case, formation of a lower core in accordance with the design is possible.

Further, since the surplus part of the upper core does not actually provide a read/write function for the head, cross-talk seldom generates between adjacent tracks. Conducting milling before forming an upper core eliminates magnetic shortcircuiting between the upper and lower cores.

BRIEF DESCRIPTION OF THE DRAWINGS

FIG. 1 is an exterior view of a conventional thin film head.

FIGS. 3-11 are sectional views illustrating the disadvantages of the conventional thin film head.

FIGS. 13 and 14 are sectional views supplementing the explanation of the embodiment of the present invention.

DESCRIPTION OF A PREFERRED EMBODIMENT

An embodiment of the present invention is described with reference to the accompanying drawings.

Figure 12:
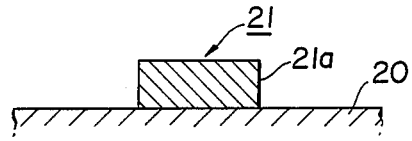
FIGS. 12(a)-12(k) are sectional views showing processes for producing a thin film head by a method according to an embodiment of the present invention.
Figure 12:
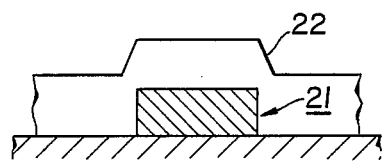
Figure 12:
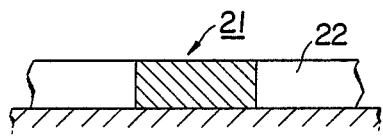
Figure 12:
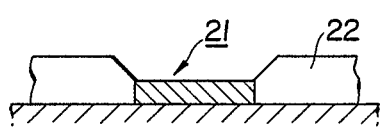
Figure 12:
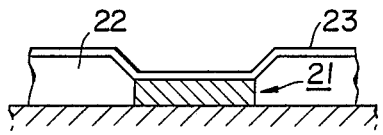
Figure 12:
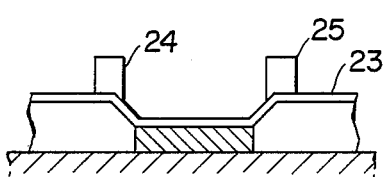
Figure 12:
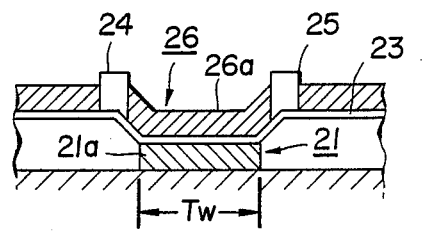
Figure 12:
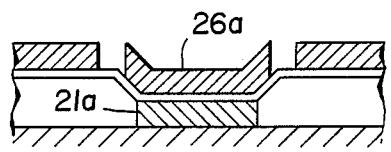
Figure 12:
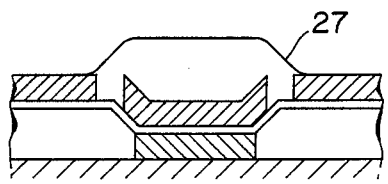
Figure 12:
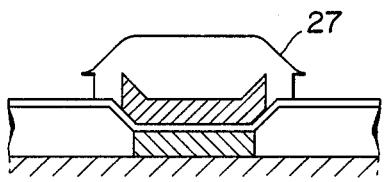
Figure 12:
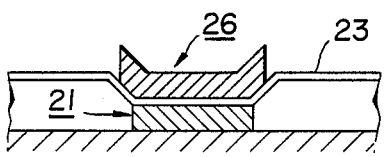

FIG. 12 illustrates sectional views showing processes for producing a thin film head embodying the present invention. As in FIG. 2 described above, the views of FIG. 12 show the faces of the upper and lower poles that face a recording medium. The following describes the procedure for producing the thin film head.

[1] First, a lower core (21) of a rectangular section is formed on the surface of a wafer (20) with permalloy by sputtering or vacuum deposition (see FIG. 12a), where the lower core (21) is 5 μm thick. The wafer (20) has no gradations in surface level in this process because no pad and coil sections have been formed. This provides an accurate focus for alignment which enables the track width to be determined in accordance with the design value. Here 21a in this drawing, represents a loer pole.

[2] Second, after the lower core (21) is formed, a substance of a lower ion milling rate than the substance of the lower core (21), such as alumina, is laminated on the surface of the wafer (21) so as to coat the lower core (21) by sputtering to form an embedded protection film (22). (See FIG. 12b). In this case, the embedded portection film (22) must be laminated up to a thickness of 7 μm.

[3] Then, both the embedded protection film (22) and the lower core (21) are ground smooth (see FIG. 12c.). In this case, both the lower core (21) and the embedded protection film 22 must be ground to a thickness of 4.3 μm.

[4] When the grinding process is finished, ion beams (for example, argon) are radiated at the lower core (21) and the protection film (22) to conduct milling (see FIG. 12d.). Since the lower core (21) has a higher ion milling rate than the embedded protection film (22), the lower core (21) is milled faster than the embedded protection film (22). This forms a surface recessed relative to the embedded protection film (22). It is known that in milling, the milling rate is at a maximum when the angle of incidence of the ion beams is 40° to 60° relative to the target. Since corners of the embedded protection film (22) are more easily cut, they form an angle of 40° to 60° parallel to the ion beams. Therefore, the part of the embedded protection film (22) which contacts the lower core (21) is cut diagonally to form bevelled edges or surfaces, as shown in FIG. 13.

In addition, the bevelled shape of the part of the embedded protection film (22) that contacts the lower core (21) prevents deposition of magnetic materials scattered during milling.

The milling is stopped when the lower core (21) attains a thickness of 1.5 μm.

In addition to argon (Ar), gases that can be used for the milling are neon (Ne), krypton (Kr), nitrogen ($N_2$), and oxygen ($O_2$). Any other gases may be used so long as the relation of the milling rate of the lower core (21) to that of the embedded protective film (22) is achieved.

[5] Then, after ion milling is finished, a gap layer (23) is formed by laminating alumina on the surface of the lower core (21) and the embedded protection film (22) by sputtering so as to coat both the lower core (21) and the embedded protection film (21) (See FIG. 12e.).

[6] Next, after the gap layer (23) is formed, a coil and an insulation layer to coat the coil, which have not been shown in the Figure, are formed on the lower core.

[7] After this process is finished, resist frames (24 and 25) for plating and forming an upper core are formed on sides of both bevelled surfaces of the embedded protection film (22) (See FIG. 12f).

[8] Then, a permalloy is laminated on the surface of the gap layer (23) by electroplating (See FIG. 12g.). This forms an upper core (26) between the resist frames (24 and 25). In this case, 26a designates an upper pole, as shown in FIG. 12g. The width of the portion in which the pole (21a) of the lower core (21) faces the pole (26a) of the upper core (26) in parallel is the track width, Tw. The parallel portion of the pole (26a) is exactly opposed to the pole (21a), i.e. the pole (26a) of the upper core (26) faces the pole (21a) of the lower core (21) in parallel via the gap layer (23) with the same width of the pole (21a), Tw, and also with no error in position. Consequently, via the parallel opposing portion of the upper and lower poles, signals can be written on a magnetic recording medium in the same width as the width of the parallel opposing portion of the poles and the recorded signals on the medium can be read in the same width as the recorded track width. Since the other portion—the portion of upper pole (26a) which does not face the lower pole (21a) in parallel (the surplus part)—is formed as a bevelled surface, this part is independent of the read/write function of the head i.e. even if this part goes in the range of the adjacent tracks in reading, due to azimuth losses, this part hardly effects to the signals to be read so that cross-talk seldom occurs. This means that forming the lower core (21) in accordance with the design enables the upper core (26) to be formed to the same width as that of the lower core (21), even if resist frames (24 and 25) are not formed at their correct position because of lack of alignment or focus generated during the formation of the resist frames (24 and 25) (See FIG. 14.). And, since the surplus part of the upper pole (26a) is independent of the read/write function, cross-talk seldom occurs between adjacent tracks.

[9] After the upper core (26) is formed, the resist frames (24 and 25) are removed by means of a solvent (See FIG. 12h.).

[10] After the above process is finished, a resist mask (27) for the core section is formed by photolithography so as to coat the upper core (26) (See FIG. 12i.).

[11] Then, portions other than that used to form the head are removed by means of etching (See FIG. 12j.).

Figure 2A:
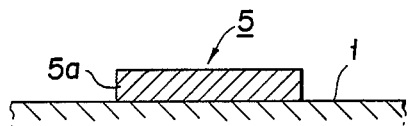
FIGS. 2(a)-2(j) are sectional views showing processes for producing a conventional thin film head.
Figure 2B:
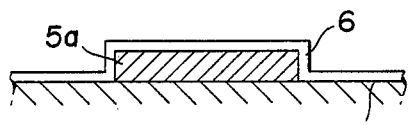
Figure 2C:
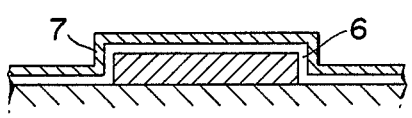
Figure 2D:
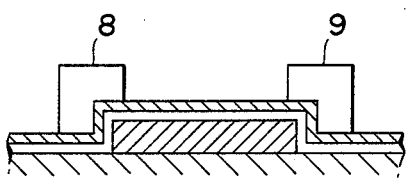
Figure 2E:
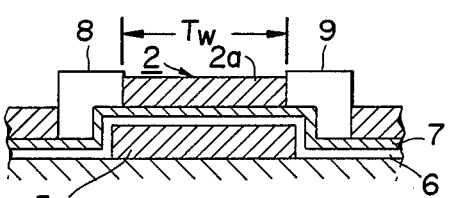
Figure 2F:
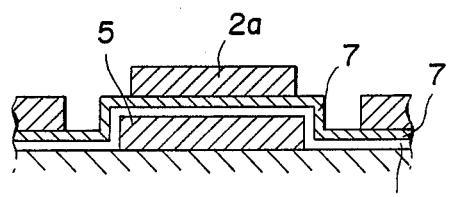
Figure 2G:
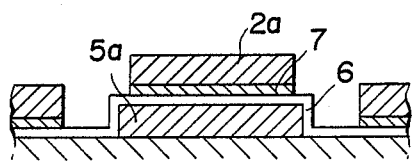
Figure 2H:
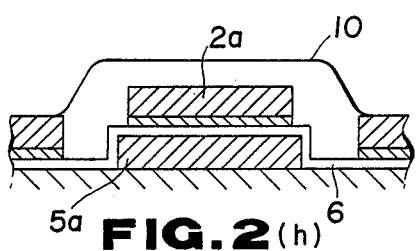
Figure 2I:
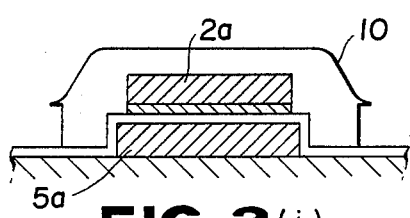
Figure 2J:
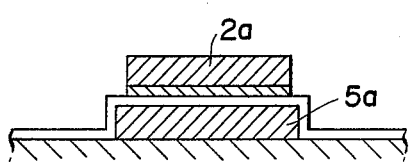
Figure 9:
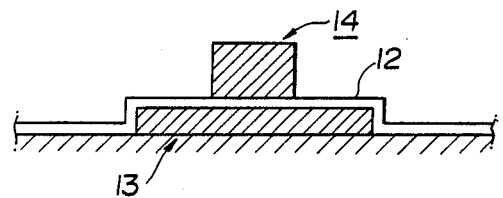
Figure 10:
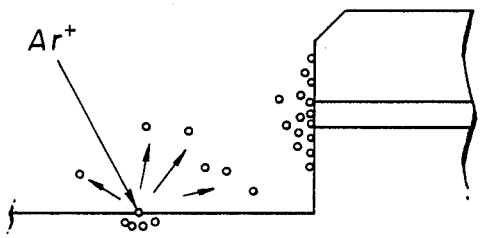
Figure 11:
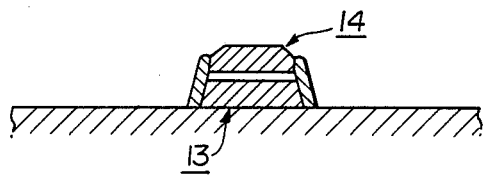

[12] Finally, the resist mask (27) for the core section is removed by means of a solvent (See FIG. 2k.).

The above procedure is a method of this invention to produce a thin film head.

In the second process (see FIG. 12b), alumina is used to form the embedded protection film (22) by sputtering. However any material can be used for the embedded protective film (22) if its ion milling rate is lower than that of the material of the lower core (21). Specifically, silicon dioxide (SiO2), silicon nitride (Si3N4), titanium dioxide (TiO2) and carbon can be used for the embedded protection film (22).

Moreover, in the example embodiments of the present invention, the upper core (26) may be formed wider than the lower core (21) to spread over the bevelled part of the lower core (21).

In the example embodiments of the present invention, the thicknesses of the lower core (21) and the embedded protection film (22) are limited to within specified values. However, the thickness is not always limited to the specified values and other values are possible.

Above is a description of a preferred embodiment of this invention. However this invention may be practiced or embodied in still other ways without departing from the spirit or essential character thereof as described heretofore. Therefore, the preferred embodiment described herein is illustrative and not restrictive, the scope of the invention being indicated by the appended claims and all variations which come within the meaning of the claims are intended to be embraced therein.

What is claimed is:

1. A method for producing a thin film head, comprising the steps of:

forming a lower core on the surface of a wafer;

coating the lower core with a protection film made of a substance having an ion milling rate lower than that of the lower core;

grinding the protection film so that the upper surface of the lower core and the upper surface of the protection film are substantially level and smoothly finished;

milling the protection film and the lower core simultaneously with radiated ion beams upon completion of the grinding step so that the upper surface of the lower core is recessed with respect to the upper surface of the protection film;

forming a gap layer on the upper surface of the lower core and the upper surface of the protection film; and forming an upper core in the recess while maintaining the gap layer between the upper core and the lower core.

2. The method according to claim 1, wherein the step of milling includes milling the protection film and the lower core until the thickness of the lower core at the recess is less than the thickness of the protection film, said recess being defined by the top surface of the lower core and inclined surfaces of the protection film, the recess being formed such that the inclined surfaces of the protection film intersect the lower core at an upper edge of the top surface of the lower core.

3. The method according to claim 1, including forming the recess with bevelled surfaces on the protection film.

4. The method according to claim 3, wherein said upper core is wider than said lower core so that outer edges of the upper core coincide with the bevelled surfaces of the recess.

* * * * *